(12) United States Patent
Zemore et al.

(10) Patent No.: US 8,880,452 B2
(45) Date of Patent: Nov. 4, 2014

(54) DATA STRUCTURE AND METHOD FOR PERFORMING MISHAP RISK OF A SYSTEM

(75) Inventors: Michael G. Zemore, King George, VA (US); Robert C. Heflin, Jr., Fredericksburg, VA (US); Shannon S. Jernigan, King George, VA (US); Charles S. Rozanski, Hughesville, MD (US); Graham C. Pierson, Fredericksburg, VA (US); Kevin G. Stottlar, Fredericksburg, VA (US); Regina A. Eller, King George, VA (US); Gary D. Smoller, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 270 days.

(21) Appl. No.: 13/385,461

(22) Filed: Jan. 31, 2012

(65) Prior Publication Data

US 2014/0244559 A1     Aug. 28, 2014

(51) Int. Cl.
*G06N 5/00* (2006.01)
*G06F 1/00* (2006.01)

(52) U.S. Cl.
USPC ............ 706/46; 705/4; 705/35; 715/255; 382/100

(58) Field of Classification Search
USPC .............................................. 706/46
See application file for complete search history.

(56) References Cited

U.S. PATENT DOCUMENTS

| 7,933,989 | B1 | 4/2011 | Barker et al. ............ 709/224 |
| 8,010,398 | B2 | 8/2011 | Abrahams et al. ......... 705/7.28 |
| 8,073,764 | B2 | 12/2011 | Glinberg et al. ........... 705/37 |
| 8,095,313 | B1 | 1/2012 | Blackburn ............... 701/301 |
| 2010/0114602 | A1* | 5/2010 | Joao et al. .................. 705/2 |
| 2012/0123959 | A1* | 5/2012 | Davis et al. ............... 705/325 |
| 2013/0096980 | A1* | 4/2013 | Basavapatna et al. ..... 705/7.28 |

* cited by examiner

*Primary Examiner* — Jeffrey A Gaffin
*Assistant Examiner* — Kalpana Bharadwaj
(74) *Attorney, Agent, or Firm* — Gerhard W. Thielman, Esq (57) ABSTRACT

A computer-implemented method is provided for performing mishap risk assessment within a system. The method includes providing a first set of data including risk information associated with at least one hazard within the system, correlating all input first set of data with a second set of data defined as a plurality of mishaps of the system such that the hazard correlates with each mishap to assess mishap potential, storing the correlated first and second sets of data, and performing mishap risk assessment within the system based the correlated data including the first and second sets of data.

18 Claims, 7 Drawing Sheets

DATA STRUCTURE AND METHOD FOR PERFORMING MISHAP RISK OF A SYSTEM

STATEMENT OF GOVERNMENT INTEREST

The invention described herein was made in the performance of official duties by one or more employees of the Department of the Navy, and the invention herein may be manufactured, practiced, used, and/or licensed by or for the Government of United States of America without the payment of any royalties thereon or therefor.

BACKGROUND

The present invention relates to a data structure for mishap risk assessment which considers all possible hazards, hazardous causes and mishaps and their effects on systems. For example, a data structure which assesses risk of mishaps associated with a military weapon system such as injury to personnel, and damage to equipment and the environment.

Existing methods for performing mishap risk assessments associated with the development or use of military weapon systems, for example, is typically centered around a single "worse case" scenario. Because these methods use a "worse case" scenario approach to mishap risk assessment, they fail to capture the complexity of multiple hazards, causal factors and mishap relationships or multiple effects of any one mishap. Further, existing methods do not allow for multiple systems and subsystem assessment to be considered in the context of a system of systems (SOS) such that unique complex situations may not be examined and recorded for safety program purposes.

It is therefore desirable to have a data structure that defines data items and relationships required to accurately perform mishap risk assessment by considering all hazards, causal factors, and mishap contributors within relevant contextual frameworks including SOSs.

SUMMARY OF THE INVENTION

The present invention obviates the above-mentioned problems by providing a computer-implemented data structure that provides data regarding all hazards, hazard causal factors, mishaps and effects thereof when performing mishap risk assessment of systems.

According to one embodiment of the present invention, a computer-implemented method for performing mishap risk assessment within a system is provided. The method includes providing a first set of data including risk information associated with at least one hazard within the system, correlating the first set of data with a second set of data defined as a plurality of mishaps of the system such that the at least one hazard correlates with each mishap to assess mishap potential, storing the correlated first and second sets of data, and performing mishap risk assessment within the system based the correlated data including the first and second sets of data.

A computer program product implemented the above-mentioned method is also provided. Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE FIGURES

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION OF EXEMPLARY EMBODIMENTS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a field programmable gate array (FPGA) or other related component.

According to an embodiment of the present invention, a data structure and method for performing mishap risk assessment is provided to facilitate safety efforts for systems such as computing systems, and weapon systems. There are several risks that may be associated with the use of a weapon system and these risks may be caused by multiple hazards and are recorded to account for multiple external effects such as injury to personnel, damage to the equipment and the environment.

Various exemplary embodiments provide a manner in which to capture data associated with hazards and mishap situations and optionally, every causal factor of the hazards. The exemplary data structure enables hazards to be correlated to one or more mishaps, and causal factors to be correlated to one or more hazards. Embodiments of the present invention may also be implemented within subsystems of systems, i.e., systems of systems (SOS).

Figure 1:
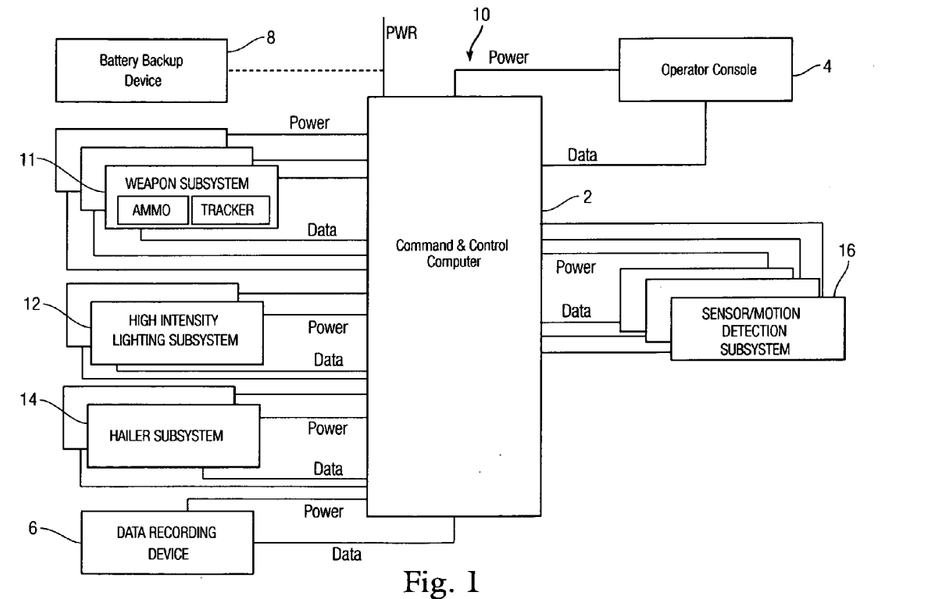
FIG. 1 is a diagram of an example of a system of subsystems (SOS) in which the present invention may be implemented.

FIG. 1 shows a protection system 10, which includes several subsystems and may therefore be considered an SOS. The system 10 includes a plurality of internal components and a plurality of external components. The plurality of internal components may include a command and control computer 2 for controlling the protection system 10, an operator console 4 in communication with the command and control computer 2, for operating and performing functions of the protection system 10 via an operator, a data recording device 6 also in communication with the command and control computer 2 for recording data associated with the protection system 10 and a battery backup 8 for providing backup power supply to the protection system 10.

The plurality of external components may include a weapon subsystem(s) 11 (e.g., guns) for providing protection against intruders, warning subsystems such as a high intensity lighting subsystem 12 (e.g., a spotlight) and a hailer subsystem 14 for providing audible alarms, and a sensor/motion detector subsystem 16 for detecting motions within an assessment zone of the system 10.

The protection system 10 is similar to a home security system and serves as an alarm and/or notification system for intrusion. Once an object enters the assessment zone of the system 10, the system 10 alerts an operator and initiates a tracking and identification process, for example.

According to an exemplary embodiment, a data structure for is provided performing mishap risk assessment of a system (e.g., the protection system 10 including the subsystems thereof). The mishap risk assessment includes determining mishap risk such as injury to personnel (e.g., operator of the operator console 4 or maintenance personnel of the subsystems 11 through 16), damage to equipment of the system 10 and subsystems 11 and 16, and the effect on the environment. Further, the present invention is not limited to being implemented within any particular system and may therefore be implemented within various types of systems as needed.

Figure 2:
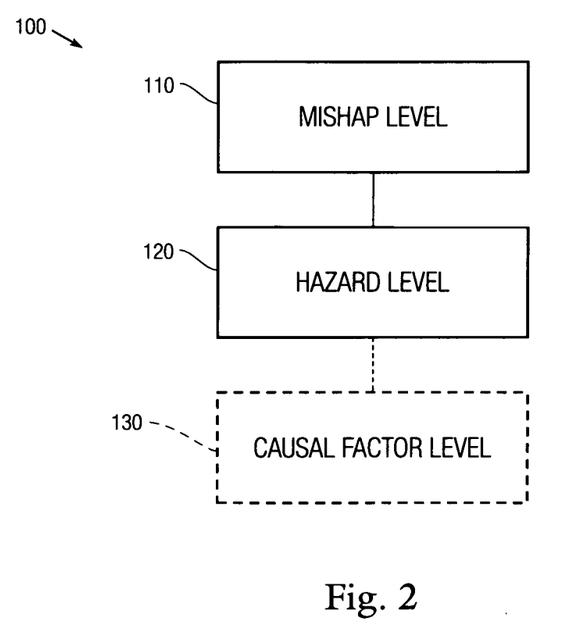
FIG. 2 is a diagram illustrating an overview of a data structure for mishap risk assessment of a system that can be implemented.

Details regarding the data structure and computer-implemented method for performing mishap risk assessment of the system according to embodiments of the present invention will now be discussed. FIG. 2 shows an overview of a data structure for mishap risk assessment of a system (e.g., the protection system 10). The data structure 100 includes a plurality of levels formed in a hierarchical configuration.

In FIG. 2, according to an embodiment of the data structure 100 is a three (3)-tier data structure and the plurality of levels includes a mishap level (ML) 110, a hazard level (HL) 120 and an optional causal factor level (CL) 130. According to an exemplary embodiment, the mishap level 110 provides for aggregate risk assessment and record of mishap risk based upon a collection and any combinations of all open hazards and optional causal factors.

This aggregate risk assessment record may be referred to as a Mishap Risk Index (MRI). The mishap level 110 further includes all the external effects of the system 10 that may include, for example, the effects on personnel, equipment and the environment. The severity of effects on personnel can range from minor cuts and abrasions to severe injury leading to permanent disability or even death.

The severity of effects to equipment (e.g., the weapon subsystem 11) could be wear on components due to excessive movement or exposure to the system 10 failing and requiring major significant maintenance work to destruction of the house, household items and neighboring structures and items. The severity of effects on the environment include minor chemical spills from maintenance activity to loss of trees, shrubs and wildlife from use of the weapon subsystem 11, the hailer subsystem 14 and light activations of the high intensity lighting subsystem 12. The overall scope for personnel, equipment and environment exposed to potential mishap includes development of the integrated system, developmental testing, packaging, handling shipping, and transportation of the system components to the site, installation and checkout, maintenance, operational testing, training, operational use, and disposal.

The present invention is not limited to any particular external effects and may vary accordingly. According to an exemplary embodiment, the hazard level 120 may include analysis information including the origin thereof and multiple hazards and the external effects thereof. The hazard level 120 further includes association information of the hazards and a plurality of mishaps at the mishap level 110.

According to an exemplary embodiment, the causal factor level 130 is an optional level. When all necessary analysis information is provided at the hazard level 120, the causal factor level 130 may be omitted. Alternatively, the causal factor level 130 may be included and provides additional information includes known issues recorded through analysis, testing, and inspection processes.

Detailed information concerning embodiments of the data structure and a method for performing mishap risk assessment in a system will now be discussed below with reference to FIGS. 3 through 6.

Figure 3:
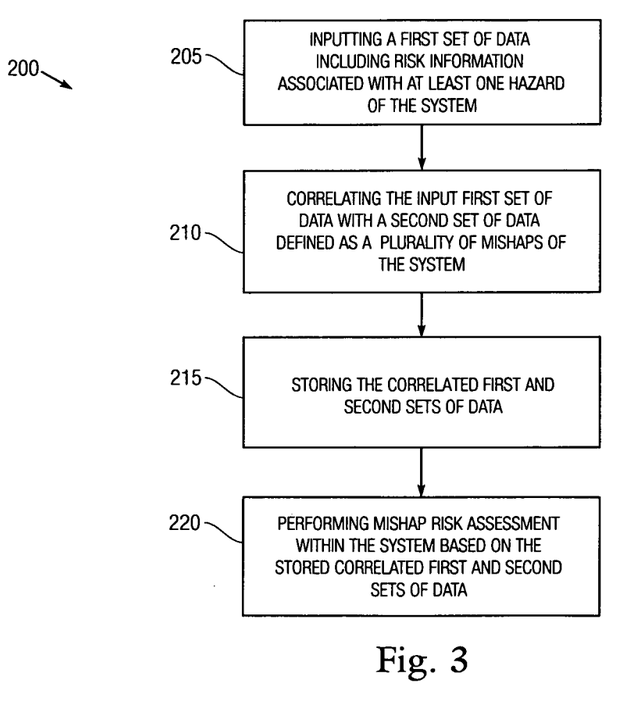
FIG. 3 is a flowchart illustrating a computer-implemented method for performing mishap risk assessment within a system that can be implemented.

FIG. 3 is a flowchart illustrating a computer-implemented method for performing mishap risk assessment within a system 10 that can be implemented within embodiments of the present invention. The method of FIG. 3 will be discussed in reference to the data structures shown in FIGS. 4 through 6, which constitute diagrams illustrating detailed data structures for mishap risk assessment of a system that can be implemented within several embodiments.

Figure 4:
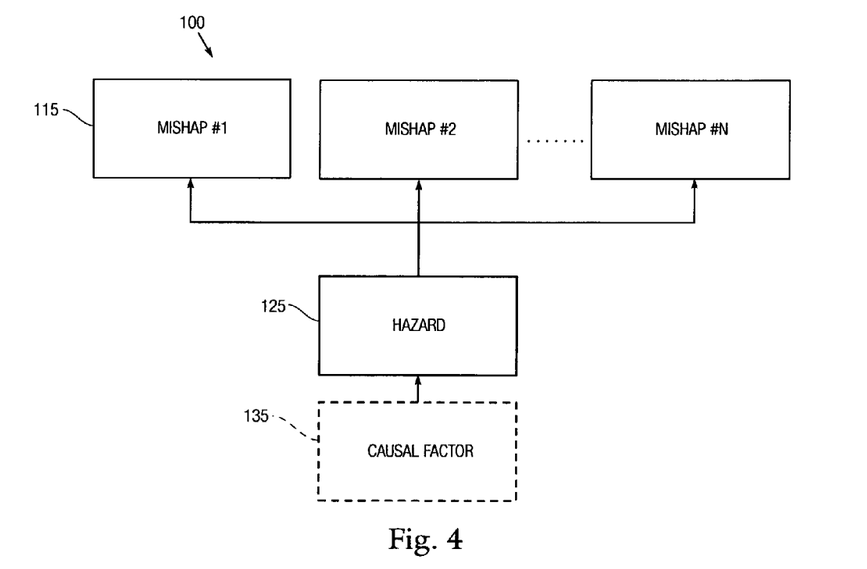
FIG. 4 is a diagram illustrated a detailed data structure for mishap risk assessment of a system that can be implemented.

As shown in FIG. 4, the data structure 100 may include a plurality of mishaps 1 to N (where N may be any positive integer). According to one embodiment of the present invention, a single hazard 125 may be associated with multiple mishaps 115. Therefore, each hazard 125 is associated with at least one mishap 115. Further, an optional causal factor 135 may be associated with a hazard 125 and a mishap 115. Each relationship between the mishap 115, hazard 125 and causal factor 135 is maintained as applicable for each definitive baseline of the system 10.

Figure 5:
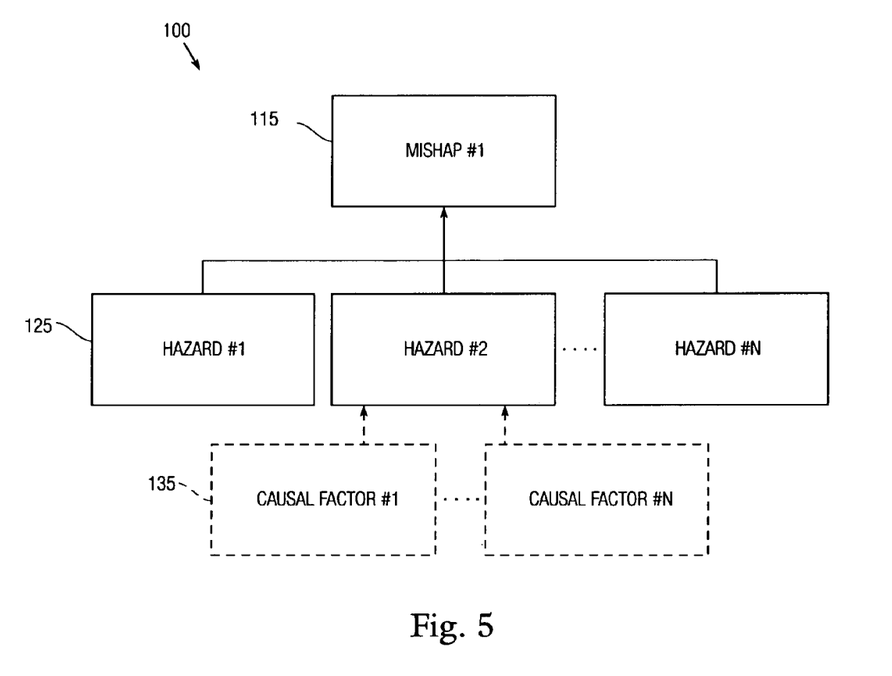
FIG. 5 is a diagram illustrating a detailed data structure for mishap risk assessment of a system that can be implemented within alternative embodiments.

According to other embodiments of the present invention, as shown in FIG. 5, there may be multiple hazards 125 to a single mishap 115. The hazards 125 may range from 1 to N. Further, there may be multiple causal factors 135 ranging from 1 to N, associated with a single hazard 125.

Figure 6:
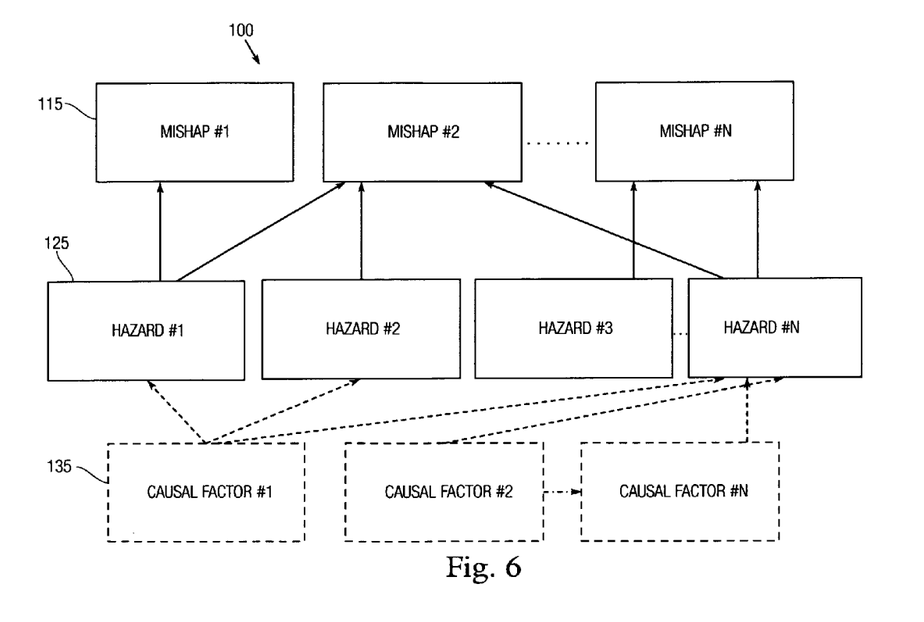
FIG. 6 is a diagram illustrating a detailed data structure for mishap risk assessment of a system that can be implemented within alternative embodiments.

According to yet another embodiment of the present invention, as shown in FIG. 6, each hazard 125 may be associated with multiple mishaps 115, and each causal factor 135 may be associated with multiple hazards 125. The present invention is not limited to any particular number of mishaps 115, hazards 125 and causal factors 135 and may vary accordingly.

Additional details regarding the data items within the data structures and the method for performing mishap risk assessment of the system will be discussed below with reference to FIG. 3.

Referring to the method shown in FIG. 3, the method 200 may be performed via a computing device (e.g., the computer 2 as depicted in FIG. 1) or system (e.g., a general purpose computer 600 as depicted in FIG. 6). The process begins at operation 205 where a user inputs (or otherwise provides) a first set of data associated with at least one hazard 115 (as depicted in FIG. 3, for example) of the system 10. According to an exemplary embodiment, the first set of data associated with the hazard 125 includes basic number and title information, analysis data, origin data, hazard description information, external effects information, system information, safety requirement information, mishap associated data and status information.

The origin data may include user document information. The origin data may include results of system safety engineering efforts such as Preliminary Hazard Analysis (PHA), Safety Requirements Criteria Analysis (SRCA), Subsystem Hazard Analysis (SSHA), system Hazard Analysis (SHA), Operating and Support Hazard Analysis (O&SHA), Health Hazard Analysis (HHA), Test, Trouble Report (TR) safety evaluation. The system information may include system baseline information of the system 10 and applicability of each hazard to each baseline of the system 10. According to an exemplary embodiment, a set of data for each hazard is established for each baseline of the system 10. Further, the hazard status information may also be included and may be determined per baseline of the system 10.

According to an exemplary embodiment, the first set of data may further include initial, current and projected risk assessment information for a given hazard. The risk definition process requires definition of a mishap 115 (e.g., mishap #1) then utilizes a projected mishap potential in terms of mishap severity (i.e., the harshness of the potential personnel injury, equipment damage, or environmental damage) and mishap probability (i.e., the probability that the mishap 115 could occur given the existence of the hazard 125) based on the existence of the hazard 125. The combination of severity level and probability level dictate the mishap risk level as High, Serious, Medium or Low.

The risk is captured within context of the hazard 125 and any causes (i.e., causal factors 135) that may be related to the existence of the hazard 125. According to an exemplary embodiment, the risk assessment remains dynamic, meaning those future causes, conditions or discoveries or even mitigations can be factored into the assessment of severity or probability within the context of the hazard and its assessment for the defined mishap 115. Any changes to severity or probability could impact the final risk level of High, Serious, Medium or Low. The mishap risk assessment associated with each hazard 125 is done for each of the three mishap effects (personnel, equipment and environment) for the mishap scenario to ensure the full risk picture is captured and maintained.

The risk assessment to date is always maintained as the "current" risk. This enables an analyst and any decision makers to fully understand the defined risk if no additional mitigations or verifications are included or performed, Initial risk is a retainer of the first documented risk assessment (severity and probability) as historical record. Finally, projected risk is an engineering assessment of future risk associated with the hazard 125 if recommended mitigations are funded and included within the system 10.

Mitigations come in the form of safer designs, safety devices, warning devices, procedures and training. At this point, the additional mishap scenarios are defined for the hazard 125 and the risk definition process continues with the definition of a new mishap 115 (e.g., mishap #2) and the projected mishap potential in terms of mishap severity and mishap probability based on the existence of the hazard as described above. This determination is completed for every potential mishap scenario defined for a given hazard 125.

From operation 205, the process continues to operation 210 where the input first set of data associated with the hazard 125 correlates with a second set of data defined as a plurality of mishaps 115 such that the at least one hazard correlates with each mishap to assess mishap potential. According to an exemplary embodiment, the input data may focus on at least one mishap 115 and all associated hazards 125 of the system 10. Within context, the 205 operation allows an analyst to evaluate the conditions of all hazards 125 relating to a single mishap 115 and to collectively assess the aggregate mishap risk (severity and probability) given the existence and potential from each of the collective hazards 125.

According to an exemplary embodiment, operation 205 may be used to assess mishap potential based on the existence of a single hazard 125, or all related hazards 125. The relationships between the mishaps 115 and the hazards 125 are defined during the operations 205 and 210. According to an exemplary embodiment, the second set of data may include the same system information as mentioned above. The second set of data will also include mishap description information, mishap effect information (e.g., on personnel, equipment or the environment), mishap status information and at least one of initial, current, or projected mishap risk information. The mishap status information may include an opening date and last modification data of the mishap 115 and any comments or recommendations as input by an operator.

From operation 210 the process continues to operation 215 where the correlated first and second sets of data are stored as records, along with the relationship tables, for example, within a computing device (e.g., the computer 2 as depicted in FIG. 1) or system 10. According to another embodiment of the present invention, a third set of data including causal factor information (e.g., a causal factor 135) associated with at least one hazard 125 of the system may also be provided.

The third set of data may include known and potential causal factors 135. According to an exemplary embodiment, the causal factors 135 may be related to one another (as depicted by an arrow at causal factor #2 shown in FIG. 6). If so, relational information between known and potential causal factors 135 may also be included in the third set of data. Additional information such as causal origin information, any associated hazards 125, mishaps 115, external effects information, and system information may also be provided.

According to an exemplary embodiment, the system information of the causal factors 135 may also include information concerning any subsystem 11 through 16 of the system 10. That is, system information concerning the primary system (e.g., the system 10) and any secondary system (subsystems 11 through 16). For system of systems (SOS) safety efforts, the system information may be used to capture safety assessment details and may include relevant data pertaining to both the primary system and the secondary system.

When the causal factor 135 applies to a SOS context, additional information is recorded to ensure the SOS risk level is maintained along with pertinent SOS context is recorded in addition to risk. From a data architectural perspective, it is likely for a causal factor 135 to include risk at the SOS level to personnel, equipment or environment that may not exist at a system level of the system 10 or subsystem 11 through 16. Therefore it is important and necessary to provide allowances for this contextual assessment and recording of risk. Next, from operation 215, the process continues to operation 220, where mishap risk assessment within the system 10 is performed based on the stored correlated first and second sets of data.

Figure 7:
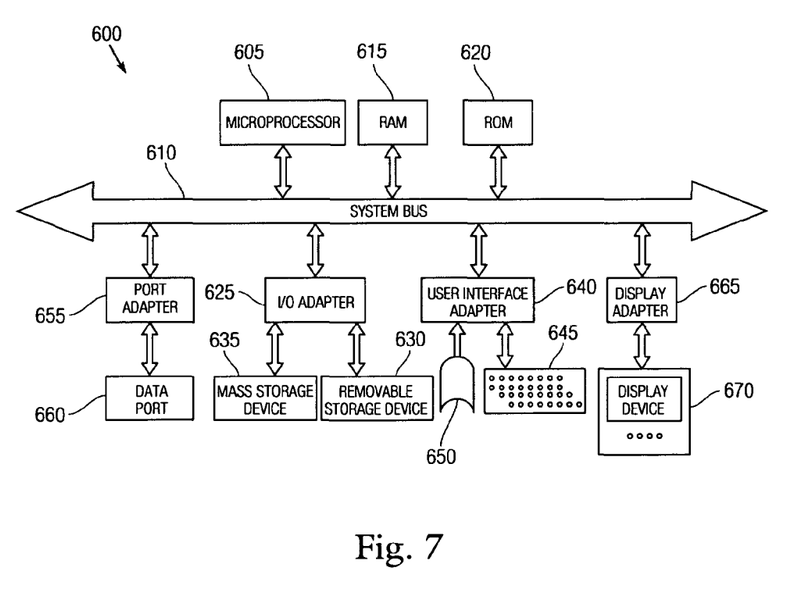
FIG. 7 is a diagram illustrating a general purpose computer that can be utilized for implementing embodiments.

FIG. 7 is a diagram illustrating a general purpose computer that can be utilized for implementing the method according to embodiments of the present invention. According to an exemplary embodiment, the computer 2 as depicted in FIG. 1 may be a general purpose computer. In FIG. 7, computer system 600 has at least one microprocessor or central processing unit (CPU) 605. The CPU 605 is interconnected via a system bus 610 to a random access memory (RAM) 615, a read-only memory (ROM) 620, an input/output (I/O) adapter 625 for a connecting a removable data and/or program storage device 630 and a mass data and/or program storage device 635, a user interface adapter 640 for connecting a keyboard 645 and a mouse 650, a port adapter 655 for connecting a data port 660 and a display adapter 665 for connecting a display device 670.

ROM 620 contains the basic operating system for computer system 600. The operating system may alternatively reside in RAM 615 or elsewhere as is known in the art. Examples of removable data and/or program storage device 630 include magnetic media such as floppy drives and tape drives and optical media such as CD ROM drives. Examples of mass data and/or program storage device 635 include hard disk drives and non-volatile memory such as flash memory. In addition to keyboard 645 and mouse 650, other user input devices such as trackballs, writing tablets, pressure pads, microphones, light pens and position-sensing screen displays may be connected to user interface 640. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 630, fed through data port 660 or typed in using keyboard 645.

In view of the above, the present method embodiment may therefore take the form of computer- or controller-implemented processes and apparatuses for practicing those processes. The disclosure can also be embodied in the form of computer program code containing instructions embodied in tangible media, such as floppy diskettes, CD-ROMs, hard drives, flash memory, or any other computer-readable storage medium, wherein, when the computer program code is loaded into and executed by a computer or controller, the computer becomes an apparatus for practicing the invention.

The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

Embodiments of the present invention provide computer-implemented methods and data structures which eliminate existing one-to-one relationships and single "worse case" mishap risk assessments by enabling one-to-multiple data relationships and multiple risk assessment within context to provide accurate risk assessment based on varying conditions, contributions and possible outcome.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The flow diagrams depicted herein are just examples. There are many variations to these diagrams or the operations described therein without departing from the spirit of the invention. For instance, the operations may be performed in a differing order, or some operations may be added, deleted, or modified. All of these variations are considered a part of the claimed invention.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for performing mishap risk assessment within a system, the method comprising:
   providing a first set of data including risk information associated with at least one hazard within the system;
   correlating the said first set of data to a second set of data defined as at least one mishap of the system to produce a third set of data such that each hazard of said at least one hazard correlates to each corresponding mishap of said at least one mishap for
assessing mishap potential;
   storing said correlated first and second sets of data; and
   performing mishap risk assessment within the system based on said third set of data including said first and second sets of data.

2. The computer-implemented method of claim 1, wherein said first set of data comprises analysis data, origin data, hazard description information, external effects information, system information, mishap association data, safety requirement information, and status information.

3. The computer-implemented method of claim 2, wherein said first set of data further comprises at least one of initial, current and projected risk assessment information.

4. The computer-implemented method of claim 2, wherein said second set of data comprises said system information, mishap description information, mishap effect information; mishap status information and at least one of initial, current and projected mishap risk information.

5. The computer-implemented method of claim 1, wherein correlating said first set of data with said second set of data to produce said third set of data includes:
   correlating a single hazard with said at least one mishap.

6. The computer-implemented method of claim 1, wherein correlating said first set of data with said second set of data includes:
   correlating a plurality of hazards to a single mishap of a plurality of mishaps to determine an aggregate risk of said single mishap.

7. The computer-implemented method of claim 1, further comprising:
   providing a fourth set of data including causal information associated with said at least one hazard of the system.

8. The computer-implemented method of claim 7, wherein said fourth set of data comprises known and potential causal factors, relational information between known and potential causal factors, causal origin information, associated hazard, mishap and external effects information, system information including subsystem information of any subsystem of the system.

9. The computer-implemented method of claim 4, wherein the system information comprises information corresponding to each version of the system.

10. A non-transitory computer-readable medium executable on a computer to implement a process for performing mishap risk assessment within a system, the process comprising:
    providing a first set of data including risk information associated with at least one hazard within the system;
    correlating said first set of data to a second set of data defined to produce at least one mishap of the system as a third set of data such that said at least one hazard correlates to each mishap of said at least one mishap for assessing mishap potential;
    storing said correlated first and second sets of data; and
    performing mishap risk assessment within the system based on said correlated data including said first and second sets of data.

11. The medium of claim 10, wherein the first set of data comprises analysis data, origin data, hazard description information, external effects information, system information, mishap association data and status information.

12. The medium of claim 11, wherein said first set of data further comprises at least one of initial, current and projected risk assessment information.

13. The medium of claim 11, wherein the second set of data comprises the system information, mishap description information, mishap effect information; mishap status information and at least one of initial, current said projected mishap risk information.

14. The medium of claim 10, wherein correlating said first set of data with said second set of data to produce said third set of data includes: correlating a single hazard with said at least one mishap.

15. The medium of claim 10, wherein correlating said first set of data with said second set of data as said third set of data includes:
    correlating a plurality of hazards to a single mishap of a plurality of mishaps to determine an aggregate risk of said single mishap.

16. The medium of claim 10, further comprising:
    providing a fourth set of data including causal information associated with said at least one hazard of the system.

17. The medium of claim 16, wherein the third set of data comprises known and potential causal factors, relational information between known and potential causal factors, causal origin information; associated hazard, mishap and external effects information, system information including subsystem information of any subsystem of the system.

18. The medium of claim 11, wherein the system information comprises information corresponding to each version of the system.

* * * * *